April 24, 1962     H. M. STRONG     3,030,662

PRESSURE DISTRIBUTION IN REACTION VESSELS

Filed May 24, 1961

Inventor:
Herbert M. Strong, by James J. Lichiello

His Attorney.

3,030,662
PRESSURE DISTRIBUTION IN REACTION VESSELS
Herbert M. Strong, Schenectady, N.Y., assignor to General
Electric Company, a corporation of New York
Filed May 24, 1961, Ser. No. 112,425
16 Claims. (Cl. 18—34)

This invention relates to reaction vessels and various materials employed for such reaction vessels. More particularly, this invention relates to various low shear strength materials which may be employed in combination with known reaction vessel materials of relatively high shear strength in order to provide improved pressure distribution in the vessel and sample or specimen therein.

Various apparatuses are available in the prior art which may be employed to subject various sample materials to excessive pressures and temperatures on the order of 100,000 atmospheres and greater and 5000° C. and greater. Among these apparatuses are, for example, the belt apparatus as illustrated in 2,941,248, Hall, and 2,918,699, Hall. These apparatuses generally require or entail the broad concept of at least one movable member moving into an aperture, or a constricting type of aperture, to provide the given pressure conditions. In order to place the sample material in such an apparatus, the sample material must ordinarily be surrounded by or contained by an additional material which will be electrically insulating at the given conditions, and which must thermally protect parts of the apparatus from being effectively weakened by high temperature conditions. In addition, a reaction vessel undergoes considerable crushing force together with a substantial reduction in size in order to submit the contained sample to high pressures. In so crushing, the reaction vessel must yet maintain internal high pressure without blowout or failure. It is, of course obvious that, in undergoing such compression or crushing, the reaction vessel material takes up or withstands a substantial portion of the load placed upon the vessel itself by means of internal friction, and also chamber wall friction. Accordingly, one desirable advantage of a given reaction vessel material is that, while performing the sealing and protecting features as described, the vessel requires minimum punch force to undergo compression to transmit force or pressure to the sample material. Furthermore, a desirable reaction vessel material should transmit pressure to the sample there-within in as substantially a hydrostatic manner as possible in order to have an even or smooth pressure distribution throughout the sample material. Among the more noted materials for reaction vessel constructions have been certain ceramics and stones, for example, pyrophyllite, catlinite and talc. While these materials satisfactorily meet the desired requirements, their transmission of pressure in a substantially hydrostatic manner can be greatly improved. Also, these materials, at the higher pressures and temperatures, may melt or decompose to give off products or gases that interfere with or have deleterious effects on the sample material under consideration. A desirable reaction vessel material, in addition to meeting the requirements as described, should melt at a higher temperature than those temperatures and pressures under which a sample is being studied, and the material should be uniform so that pressure is, in turn, applied uniformly to a sample material. The material also should have no volume discontinuities or phase transitions which affect the application of pressure or the final pressure to be reached. However, in considering the desirable features of reaction vessel materials, it is to be noted that some volume discontinuities are not deterrent factors where they are relatively small discontinuities and take place at relatively lower pressures than a given reaction, or at higher pressures than a given reaction. Melting of a given material may be minimized so that the material may be employed for its other and more important advantages. For example, proper placing of the heater in the material may localize melting. NaCl has been found to melt near the heater at high temperatures, but remain solid within about 2 mm. from the heater. It has been discovered that generally certain inorganic salts, oxides, and elements or substances having cubic crystal lattice singly and in combination with pyrophyllite, catlinite, talc, and other prior materials provides a reaction vessel having the most advantageous characteristics commensurate with meeting operative requirements. Such materials will hereinafter be referred to as pressure distributors or low shear strength material.

Accordingly, it is an object of this invention to provide a new and improved reaction vessel.

It is another object of this invention to provide a reaction vessel containing a pressure distributor material.

It is another object of this invention to provide an improved controlled deformation reaction vessel.

It is another object of this invention to provide a reaction vessel to transmit high pressures in a more hydrostatic manner.

It is another object of this invention to provide a more stable reaction vessel.

It is a further object of this invention to provide a more controllable extruding type of reaction vessel.

Briefly described, this invention in one form includes a reaction vessel body which combines the advantageous feature of stones and ceramics, such as pyrophyllite, catlinite and talc, in combination with various inserts and configurations of low shear strength or pressure distributing materials to provide a new and improved reaction vessel.

This invention will be better understood when taken in connection with the following description and the drawing in which.

When pyrophyllite and catlinite and other such materials are used for sample holders or reaction vessels in high pressure work, certain disadvantages are encountered. One in particular, is that these materials do not transmit pressure as uniformly as desired and support quite large pressure gradients. Secondly, when these materials are heated under higher pressures, they undergo a phase change or transition accompanied by loss of volume and therefor, of pressure. Because of these salient properties, these materials have limitations in adequately transmitting pressure to the sample, for example, in a diamond growth process. During diamond growth conditions, there is about a 30 percent loss of volume in the reaction, and the reaction vessel materials should follow this loss of volume, but generally fail to do so. When using such materials, for example, sodium chloride, silver chloride, potassium chloride, and potassium bromide, it has been discovered that these materials transmit pressure more hydrostatically, withstand the high temperatures and pressures, and do not undergo "volume losing" change of phase conditions in desired operating ranges.

For example, diamonds have been grown in a sodium chloride sample holder when using a press load that was ordinarily too low to provide for diamond growth in a pyrophyllite sample holder. A clear demonstration of how a metallic salt such as NaCl distributes pressure in an improved manner is seen in a barium transition test. Such a test involves a cylindrical NaCl reaction vessel which includes a centrally drilled opening in which there is inserted a barium wire, and a pyrophyllite end cap or disc on each end of the cylinder. When exposed to high pressure and high temperature conditions in the belt-type apparatus, the NaCl section of the sample holder squeezed the sides of the barium wire and extruded the barium wire into the pyrophyllite end caps. The pyrophyllite apparently transmits substantially more pressure in the vertical directions than in the horizontal directions.

Because of the unique pressure transmitting properties of many of the low shear strength materials, they are found extremely difficult to contain in any defined volume. Accordingly, a low shear strength reaction vessel containing only a low shear strength material will not contain pressure because of its fluid characteristics, at high pressure, which leads to blowouts and failure. It has been discovered, however, that a reaction vessel may be composed of combinations of low shear strength materials and pyrophyllite, catlinite, talc, etc., in such a manner that full advantage is taken of each material, in that the low shear strength material provides more uniform and more substantially hydrostatic pressure transmission, while at the same time the ceramic or stone material contains the low shear strength material and bolsters the effects of the low shear strength material by providing even pressure distribution and transmission.

Figure 1:
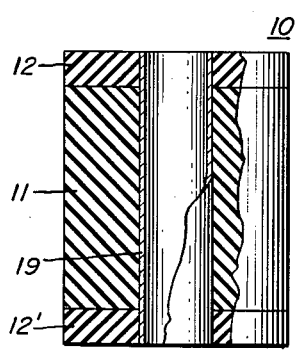
FIG. 1 illustrates one preferred embodiment of this invention utilizing a low shear strength material vessel with high shear strength end members.

One example of the teachings of this invention is disclosed in FIG. 1. Referring now to FIG. 1, there is illustrated a preferred form of a cylindrical reaction vessel which may be used in the Hall type belt apparatus for example. It is quite obvious that the features of this invention can be applied to other vessels which are not truly cylindrical in form but which may be of geometrical forms such as trapezoidal, rhombohedral, cubical, rectangular parallelepiped, etc. and other forms both geometrical and irregular or combinations thereof.

Reaction vessel 10 includes a central or intermediate portion 11 of a low shear strength material, for example, NaCl. In order to contain or support the NaCl portion 11 when subjected to high pressures, a pair of end pieces 12 and 12' are positioned concentrically with and on each end of portion 11. The combined thickness of the end pieces are about ⅕ to ⅓ the overall length of the reaction vessel. During compression, the low shear strength portion 11 transmits pressure substantially hydrostatically because of its more fluid characteristics under high pressure. Ordinarily this condition leads to failure or blowout axially. When the end pieces 12 are of the desired thickness and of a material such as pyrophyllite, its high shear strength and superior gripping properties enable it to contain, support, and aid the low shear strength material in pressure transmission. At the same time, the pyrophyllite also transmits pressure so that by being matched to the low shear strength material, optimum advantages of each are obtained. Examples of high shear strength materials are included in Table I.

*Table I*

Catlinite
Pyrophyllite
MgO—polycrystalline
$Al_2O_3$—polycrystalline
Carbon
Graphite
Silica Examples of low shear strength materials are included in Table II.

*Table II*

| | |
|---|---|
| LiF | Sr |
| $LiNO_3$ | Pb |
| $Li_2SO_4$ | $SbBr_3$ |
| $Li_2CO_3$ | MgO single crystal |
| $Na_2WO_4$ | CsBr |
| NaF | S |
| NaCl | KCl |
| NaI | KBr |
| NaOH | KI |
| $NaNO_3$ | $K_2SO_4$ |
| $Na_2SO_4$ | $K_2CO_3$ |
| $Na_2Cr_2O_7$ | $CaI_2$ |
| $SrCl_2$ | $CuCl_2$ |
| $Ag_2O$ | Se |
| AgBr | RbCl |
| $Ag_2SO_4$ | RbBr |
| CsCl | Graphite—well crystallized |
| AgCl | and pure. |
| In | |

A more complete description of shear strength properties of these and other materials may be found in "Shearing Phenomena at High Pressures Particularly in Inorganic Compounds"—P. W. Bridgman—American Academy of Arts and Sciences, vol. 71, No. 9, January 1937.

Preferred low shear strength materials providing optimum results are included in Table III

*Table III*

| | |
|---|---|
| $CuBr_2$ | NaCl |
| CsCl | AgCl |
| $Ag_2SO_4$ | KCl |
| $CdI_2$ | $COCl_3$ |
| KBr | AgBr |
| In | Sn |
| Pb | | in combination, preferably, with pyrophyllite. It is, of course, understood that mixtures or combinations of these materials may also be employed and that the final choice depends on the particular conditions, i.e., the pressure and/or temperature to be employed, relative thermal and electrical conductivity, etc. In FIG. 1, and other illustrated embodiments, the reaction vessel is adapted to contain a sample or again surround the sample so that it is a containing vessel. Thus, reference is made to the parts as peripheral members.

Figure 2:
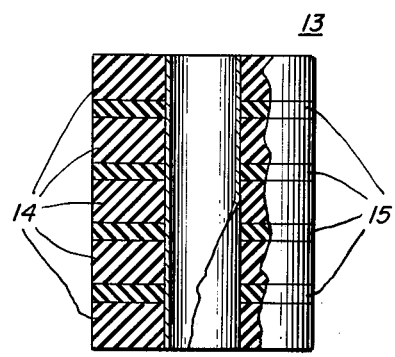
FIG. 2 illustrates a laminar assembly of high and low shear strength materials to provide a reaction vessel.

A modification of the invention of FIG. 1 is illustrated in FIG. 2. In FIG. 2 the cylindrical form of reaction vessel 13 includes a plurality of annular washers 14 of a high shear strength material, for example, pyrophyllite and a plurality of annular washers 15 of a low shear strength material such as a metallic salt or a soft metal. These parts are arranged coaxially in alternate stacked relationship to be utilized as a reaction vessel. Examples of the low shear strength materials are those preferred materials as previously described and, in addition, the softer metals, such as lead, tin and indium. In the construction of reaction vessel 13, a preferred relationship includes the uppermost and lowermost washer 14 to be of the pyrophyllite or related high shear strength material and the combined thickness of both the uppermost and lowermost washer being equal to about ⅕ to ⅓ the total length of the reaction vessel.

Figure 3:
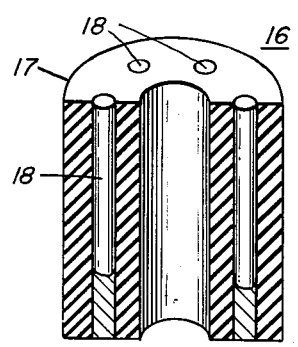
FIG. 3 illustrates a modification of the invention of FIG. 1 utilizing low shear strength inserts in high shear strength material.

A further modification of this invention is illustrated in the reaction vessel of FIG. 3. In FIG. 3, reaction vessel 16 includes a cylinder 17 of high shear strength materials, such as pyrophyllite, catlinite, etc., together with inserts 18 of a low shear strength material preferably a metal. These low shear strength material inserts 18 are positioned in a plurality of longitudinally or axially drilled passages in cylinder 17. Where the inserts are of metal, the ends thereof are suitably covered or electrically insulated to prevent electrical current flow therethrough resistance heating of a sample in the vessel in the known manner in a belt apparatus.

Sodium chloride under some conditions evolves gases which deleteriously affect a diamond growing reaction. The advantageous characteristics of sodium chloride and any other material which evolves injurious gases may yet be attained by the use of a vapor barrier between the material and the reaction vessel contents. Referring again to FIG. 1, such a barrier 19 is in the form of a tube of a material such as a metal, MgO, $Al_2O_3$ or other ceramic which remains integral during high pressure high temperature conditions.

It is obvious that in accordance with the teachings of this invention that two or more materials may be combined as described or dispersed one within the other, or made up of mixtures of these materials which are then compressed and suitably bonded. When using a NaCl vessel, no particular difference was noted in utilizing a single crystal vessel or a polycrystalline vessel. However, single crystal NaCl gave a sharper barium transition at lower press loading than polycrystalline NaCl.

Criteria for the choice of the low shear strength material includes several factors. Ordinarily, melting of the material at a given pressure is not desirable. However, even though the melting points of some of these materials are given in the 400° C. to 800° C. range, the high pressures contemplated raise the melting points several hundred degrees. Insofar as electrical conductivity is concerned, the various materials other than the metals have electrical conductivity on the order of two magnitudes less than that of graphite, for example, in a diamond growth process. Thermal conductivity of NaCl is similar to that of pyrophyllite. Compressibility is not a salient determining factor because, over a wide range, for example, NaCl is about 50 percent less compressible than AgCl, yet, a NaCl vessel gave the same pressure calibration curve as AgCl. Some high pressure high temperature apparatuses are operated in such a manner to provide gasketing by reaction vessel extrusion. For example, in the belt apparatus employing a pair of punches adapted to move into a chamber, the reaction vessel which is placed in the chamber is sufficiently large so that the punches in pushing thereon cause the reaction vessel material to extrude between the punches and chamber walls to act as gasketing. Previously low shear strength materials were not adequate and blowouts resulted. By the teachings of this invention, the superior gripping properties of pyrophyllite, catlinite, etc. are employed to prevent blowouts while, at the same time, the use of the low shear strength materials facilitates and controls extrusion. The invention as illustrated in FIG. 2 is particularly adaptable to the extrusion process.

Thus far there has been taught that certain combinations of materials will not only reduce the press load required to attain a given high pressure condition, but will also provide a greater uniformity of pressure distribution in a given sample in a reaction vessel. Uniformity of pressure has a pronounced effect on a high temperature high pressure reaction such as diamond growth from graphite. Accordingly, in a diamond growing process, the sample material also must be, for example, of low shear strength to submit to pressure uniformly. This is particularly important in the growth of larger diamond crystals so that growth will not be interrupted by pressure fluctuations or loss. The practice of this invention is thus applicable to the sample material which usually is spectrographic purity graphite. Graphite in powder form may be mixed with low shear strength materials and these materials by being of low shear strength, slip quite easily to smooth out uneven pressure distribution in graphite.

Figure 4:
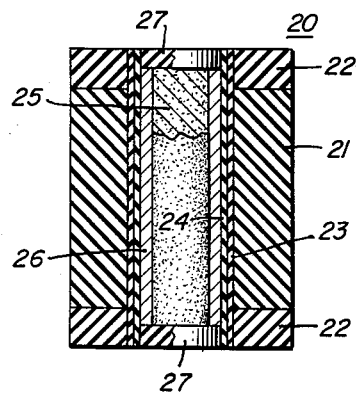
FIG. 4 ilustrates a further modification of the invention of FIG. 1.

Optimum results of this invention as related to diamond growth are attained by the use of the reaction vessel configuration of FIG. 4. Referring now to FIG. 4, reaction vessel 20 includes an outer cylinder 21 of a low shear strength material for the purposes as described. Positioned concentrically on each end of cylinder 21 is a washer or end piece 22 of pyrophyllite, catlinite, etc. which supports cylinder 21. The combined thickness of washers 22 amounts to about ⅓ to ⅕ the overall length of vessel 20. The internal volume of reaction vessel 20 is heated by means of electrical resistance heating, and therefore an electrically conductive heater tube 23 is positioned concentrically within cylinder 21. In order to shield the contents or the internal volume from deleterious gases or molten material, a barrier tube 24 is concentrically positioned within tube 23. Tube 23 is in one example, substantially pure MgO or $Al_2O_3$. The sample material for diamond growth includes graphite 25 surrounded by a catalyst metal tube 26. A disc cap 27 of MgO is positioned concentrically with vessel 20 and at each end of shorter catalyst tube 26 to provide a barrier, temperature shield and smooth vessel configuration. The teachings of this invention are practiced in high temperature high pressure reaction vessels by incorporating low shear strength materials as described into the higher shear strength materials, such as catlinite, pyrophyllite, etc., in a combination which utilizes the basic advantages of each.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What I claim as new and desire to secure by Letters Patent of the United States is:

1. In a reaction vessel for high pressure high temperature apparatus where said reaction vessel is compressed to transmit high pressures to a sample material therein, the combination comprising, a high shear strength material utilized as a supporting material in said reaction vessel and an intermediate portion of said vessel being of a low shear strength material.

2. In a reaction vessel for high pressure high temperature apparatus where said reaction vessel is compressed to transmit high pressures to a sample contained therein, the combination comprising, a low shear strength material utilized as an intermediate portion of a side wall of said vessel, and a high shear strength material utilized as the end portion of a side wall of said vessel.

3. The invention as recited in claim 1 wherein said high shear strength material is taken from the group consisting of Table I.

4. The invention as recited in claim 1 wherein said low shear strength material is a material taken from the group consisting of Table II.

5. In a reaction vessel for high pressure high temperature apparatus where said reaction vessel is compressed to transmit high pressures to a sample material contained therein, the combination comprising, a high shear strength material utilized as a supporting material in said reaction vessel and an intermediate portion of said vessel being of a low shear strength material, said high strength shear material being a material taken from the group consisting of Table I, and said low shear strength material being a material taken from the group consisting of Table II.

6. The invention as recited in claim 5 wherein said high shear strength material is pyrophyllite and said low shear strength material is NaCl.

7. In a reaction vessel for high pressure high temperature apparatus where said reaction vessel is adapted to contain a sample material and is compressed to transmit high pressures to the sample material therein, the combination comprising, a first peripheral member about said sample material to contain said material, said member being of a high shear strength material, and a second peripheral member adjacent said first peripheral member, said second peripheral member being of a low shear strength material.

8. The invention as recited in claim 7 wherein at least two peripheral low shear strength members are employed.

9. The invention as described in claim 8 wherein a plurality of each material peripheral member is employed.

10. The invention as recited in claim 9 wherein said two peripheral high shear strength members comprise at least ⅓ to ⅕ the length of said vessel.

11. In a reaction vessel for high pressure high temperature apparatuses adapted to contain a sample material and where said vessel is compressed to transmit high pressures to the sample material therein, the combination comprising, a high shear strength material vessel adapted to contain said sample material, said high shear strength material containing an aperture therein, and a low shear strength material in said aperture.

12. The invention as recited in claim 11 wherein said low shear strength material is taken from the group consisting of Table II.

13. The invention as recited in claim 11 wherein said high shear strength material is taken from the group consisting of Table I.

14. The invention as recited in claim 11 wherein said low shear strength material is taken from the group consisting of Table III.

15. The invention as recited in claim 11 wherein said high shear strength material is taken from the group consisting of Table I, and said low shear strength material is taken from the group consisting of Table III.

16. In a reaction vessel for high pressure high temperature apparatuses adapted to contain a sample material therein wherein said reaction vessel is compressed to transmit high pressures to a sample therein, the combination comprising, a high shear strength pyrophyllite vessel adapted to contain the sample therein, said vessel having a plurality of longitudinal apertures therein, and NaCl filling said apertures.

References Cited in the file of this patent

UNITED STATES PATENTS

| | | |
|---|---|---|
| 2,941,251 | Strong | June 21, 1960 |
| 2,941,252 | Bovenkerk | June 21, 1960 |
| 2,944,289 | Hall | July 12, 1960 |
| 2,992,900 | Bovenkerk | July 18, 1961 |